(12) United States Patent
Tarroni et al.

(10) Patent No.: US 12,337,928 B2
(45) Date of Patent: Jun. 24, 2025

(54) VEHICLE WITH AT LEAST TWO WHEELS AND WITH SWINGARM HAVING ADJUSTABLE LATERAL STIFFNESS

(71) Applicant: DUCATI MOTOR HOLDING S.P.A., Bologna (IT)

(72) Inventors: Alberto Tarroni, San Lazzaro di Savena (IT); Giulio Bartolacci, Casalecchio di Reno (IT); Angelo Costanzo, Bologna (IT); Marco Zambenedetti, Bologna (IT); Fausto Castellani, Cesena (IT); Giacomo Guffanti, Lesmo (IT)

(73) Assignee: DUCATI MOTOR HOLDING S.P.A., Bologna (IT)

( * ) Notice: Subject to any disclaimer, the term of this patent is extended or adjusted under 35 U.S.C. 154(b) by 0 days.

(21) Appl. No.: 18/764,774

(22) Filed: Jul. 5, 2024

(65) Prior Publication Data

US 2025/0042502 A1 Feb. 6, 2025

(30) Foreign Application Priority Data

Aug. 1, 2023 (IT) .......................... 102023000016218

(51) Int. Cl.
*B62K 25/28* (2006.01)
*B62K 25/04* (2006.01)

(52) U.S. Cl.
CPC ...... *B62K 25/283* (2013.01); *B62K 2025/047* (2013.01)

(58) Field of Classification Search
CPC ....... B62K 25/283; F16C 19/463; F16C 19/46

USPC .......................................... 384/572
See application file for complete search history.

(56) References Cited

U.S. PATENT DOCUMENTS

| | | | |
|---|---|---|---|
| 6,024,185 A * | 2/2000 | Okada | B62K 11/04 180/227 |
| 6,189,638 B1 | 2/2001 | Ito et al. | |
| 6,899,193 B1 | 5/2005 | Anibas | |
| 6,913,101 B2 * | 7/2005 | Uneta | B62K 25/00 180/219 |
| 7,665,563 B2 * | 2/2010 | Misaki | B62K 25/283 180/227 |
| 2002/0011370 A1 | 1/2002 | Kido et al. | |

(Continued)

FOREIGN PATENT DOCUMENTS

| | | |
|---|---|---|
| DE | 19941867 A1 | 3/2000 |
| DE | 102021101603 A1 | 8/2021 |

(Continued)

OTHER PUBLICATIONS

European search report completed Nov. 22, 2024 for European Application No. 24186560.9.

(Continued)

*Primary Examiner* — James A English
(74) *Attorney, Agent, or Firm* — Vorys, Sater, Seymour and Pease LLP

(57) ABSTRACT

A two- or three-wheeled vehicle having at least one front wheel and one rear wheel connected to a chassis thanks to a suspension system, the rear suspension including a swingarm connected to the chassis. The swingarm may rotate around an axis for fixing to the chassis but it may also translate along such axis perpendicular to a median plane of the vehicle.

18 Claims, 3 Drawing Sheets

(56) References Cited

U.S. PATENT DOCUMENTS

| | | | | |
|---|---|---|---|---|
| 2008/0156571 | A1* | 7/2008 | Kofuji | B62K 25/286 |
| | | | | 180/348 |
| 2008/0230293 | A1* | 9/2008 | Igarashi | B62K 11/04 |
| | | | | 180/227 |
| 2009/0308677 | A1* | 12/2009 | Castellani | B62K 11/04 |
| | | | | 180/219 |
| 2011/0074129 | A1* | 3/2011 | Yokoyama | B62K 25/283 |
| | | | | 280/124.128 |
| 2012/0200145 | A1* | 8/2012 | Kakuda | B60B 3/04 |
| | | | | 301/109 |
| 2012/0325571 | A1* | 12/2012 | Nomura | B60K 6/48 |
| | | | | 903/902 |
| 2013/0228389 | A1* | 9/2013 | Nakashima | B62K 11/00 |
| | | | | 180/220 |
| 2016/0200391 | A1* | 7/2016 | Ishida | B62K 25/286 |
| | | | | 180/231 |
| 2017/0088233 | A1* | 3/2017 | Kuwabara | B62K 25/283 |
| 2023/0375037 | A1* | 11/2023 | Rumeau | F16F 7/04 |

FOREIGN PATENT DOCUMENTS

| | | |
|---|---|---|
| EP | 2969724 | 1/2016 |
| EP | 3150478 A1 | 4/2017 |
| WO | 2014144224 A1 | 9/2014 |

OTHER PUBLICATIONS

Rapporto di Ricerca (translates as Research Report), Jan. 31, 2024, for Italian patent application No. 102023000016218, filed Aug. 1, 2023.

* cited by examiner

VEHICLE WITH AT LEAST TWO WHEELS AND WITH SWINGARM HAVING ADJUSTABLE LATERAL STIFFNESS

CROSS-REFERENCE TO RELATED APPLICATION

This claims the benefit of Italian patent application no. 102023000016218, filed Aug. 1, 2023, incorporated by reference.

Forming an object of the present invention is two- or three-wheeled vehicle, such as a cycle or a motorcycle, according to the preamble of the main claim.

As known, a vehicle of the type mentioned above, such as a common motorcycle comprises a chassis connected to at least one front wheel and one rear wheel; in the case of a motorcycle, to which reference will be made to by way of example in the description hereinafter, said chassis supports at least one motor which contributes to the chassis function and which also acts as a drive means. Such engine may be an internal combustion, or electric or hybrid engine. In the present document, also the part or engine which collaborates to the performance of such function will be considered as chassis.

The engine drives a chain cooperating with a pinion or gearwheel integrally joined with the hub of the rear wheel so as to obtain the movement of the vehicle.

The rear wheel cooperates with a swingarm (which can be with a single arm or with two arms, commonly referred to as bi-arm) connected, at a first end thereof, to the chassis. The second end of the swingarm (if with one arm) or its second ends are integrally joined with the hub of the rear wheel using the common pin of the wheel.

The first end of the swingarm comprises two arms provided at the free ends with through holes in "little hubs" which, normally, house a pin or shaft which is arranged in a hole provided in the chassis, said hole having a longitudinal axis arranged transversely and perpendicularly to a median longitudinal plane of the motorcycle.

There may be provided for plates and/or brackets which also collaborate to perform the "chassis" function.

With reference to the method for constraining the swingarm to the frame, usually the shaft or pin which connects the arms of the first end of the swingarm is inserted into mechanical de-coupling members defined by a combination of ball bearings, roller and/or needle roller cages. Such constraint fixes the aforementioned arms to the chassis while allowing them to rotate around the longitudinal axis of the shaft or pin mentioned above.

Although excellent in allowing the required relevant rotary movement on the longitudinal plane between the swingarm and the chassis which occurs by contrast to a usual suspension member, the known solution does not allow the swingarm to move more or less stiffly along the axis of the shaft which constrains it to the chassis. As a result, the stiffness along such axis cannot be calibrated (i.e. adjusted) without replacing the swingarm or its parts. Such stiffness may be particularly critical when the motorcycle bends in a curve, particularly if the motorcycle is of the racing type: as a matter of fact, as long as the stresses transmitted to the swingarm-suspension member assembly lie on a longitudinal plane, the swingarm-suspension member assembly excellently performs the purpose for which it is provided. When such stresses have a component perpendicular to such longitudinal plane, such as but not only when the vehicle bends, such assembly can operate in a way which is not entirely correctly.

Therefore, there arises the need to provide a solution for constraining the swingarm to the chassis of the vehicle so that the stiffness of the swingarm is such to guarantee the best absorption of the stresses in any riding step.

Therefore, an object of the present invention is to provide a two or three-wheeled vehicle such as a cycle or a motorcycle provided with a swingarm connected to the chassis so that the lateral stiffness of the entire rear axle of the vehicle (comprising the swingarm and wheel) can be suitably calibrated to maximise the overall performance of the motorcycle, whether a racing motorcycle (therefore maximise, for example, speed at which the vehicle takes a curve) or a road motorcycle (therefore maximise, for example, the riding comfort).

Therefore, the object of the invention is to allow the more or less stiff translation of the swingarm along the aforementioned axis or pin and therefore the possibility to adjust the stiffness of the rear axle by acting in the points for constraining the swingarm to the chassis depending on the need or, for example, as a function of riding step that occurs during a certain path.

Another object is to provide a vehicle of the type mentioned above where the adjustment mentioned above is obtained in a simple and quick manner.

These and other objects which shall be more apparent to the person skilled in the art are attained by a vehicle according to the attached claims.

For a better understanding of the present invention, the following drawings are attached hereto, purely by way of non-limiting example, wherein.

Figure 1:
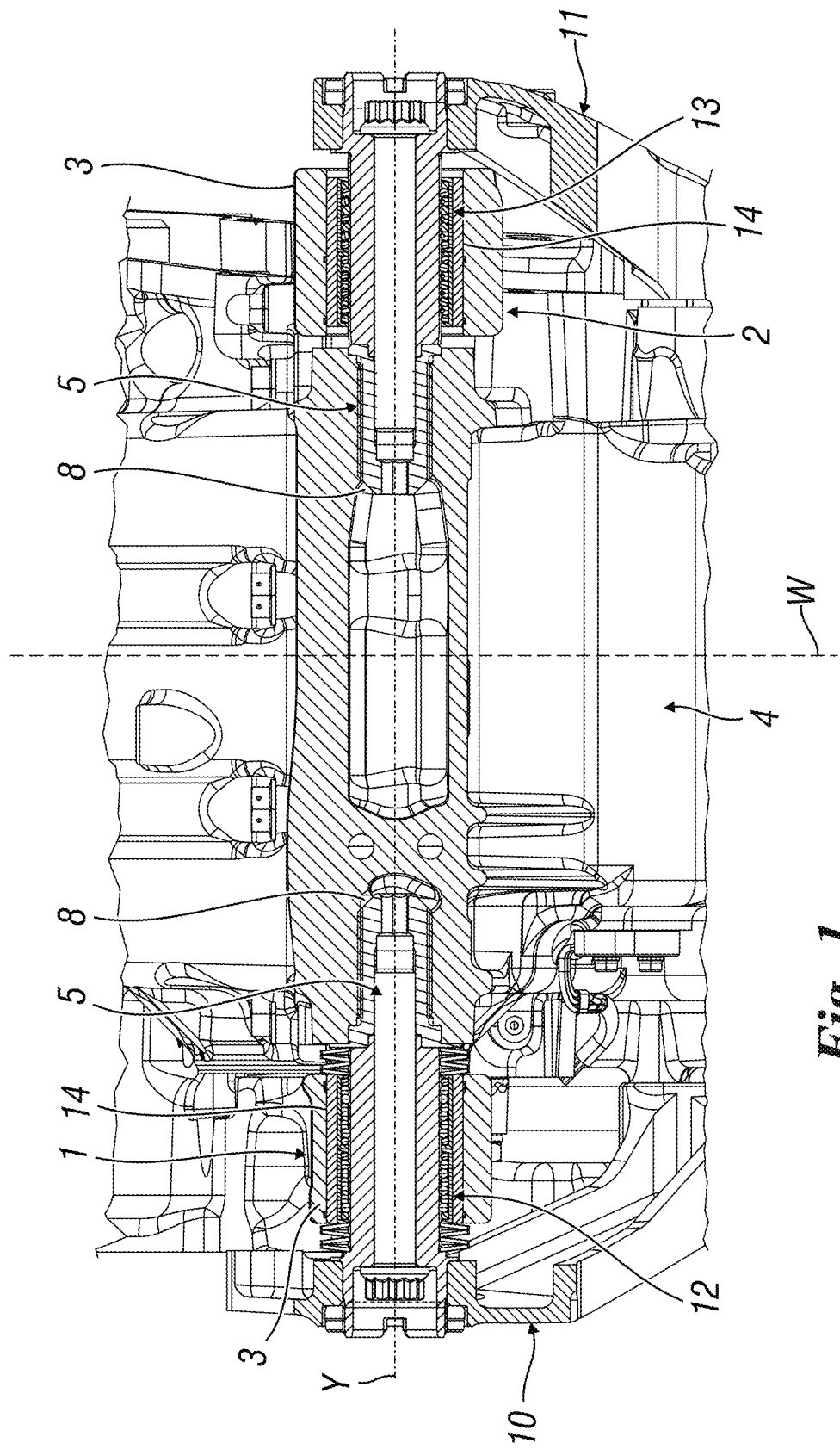
FIG. 1 shows a cross-section of a part of a vehicle according to the invention where the rear swingarm is fixed, said vehicle being a motorcycle, by way of example.
Figure 2:
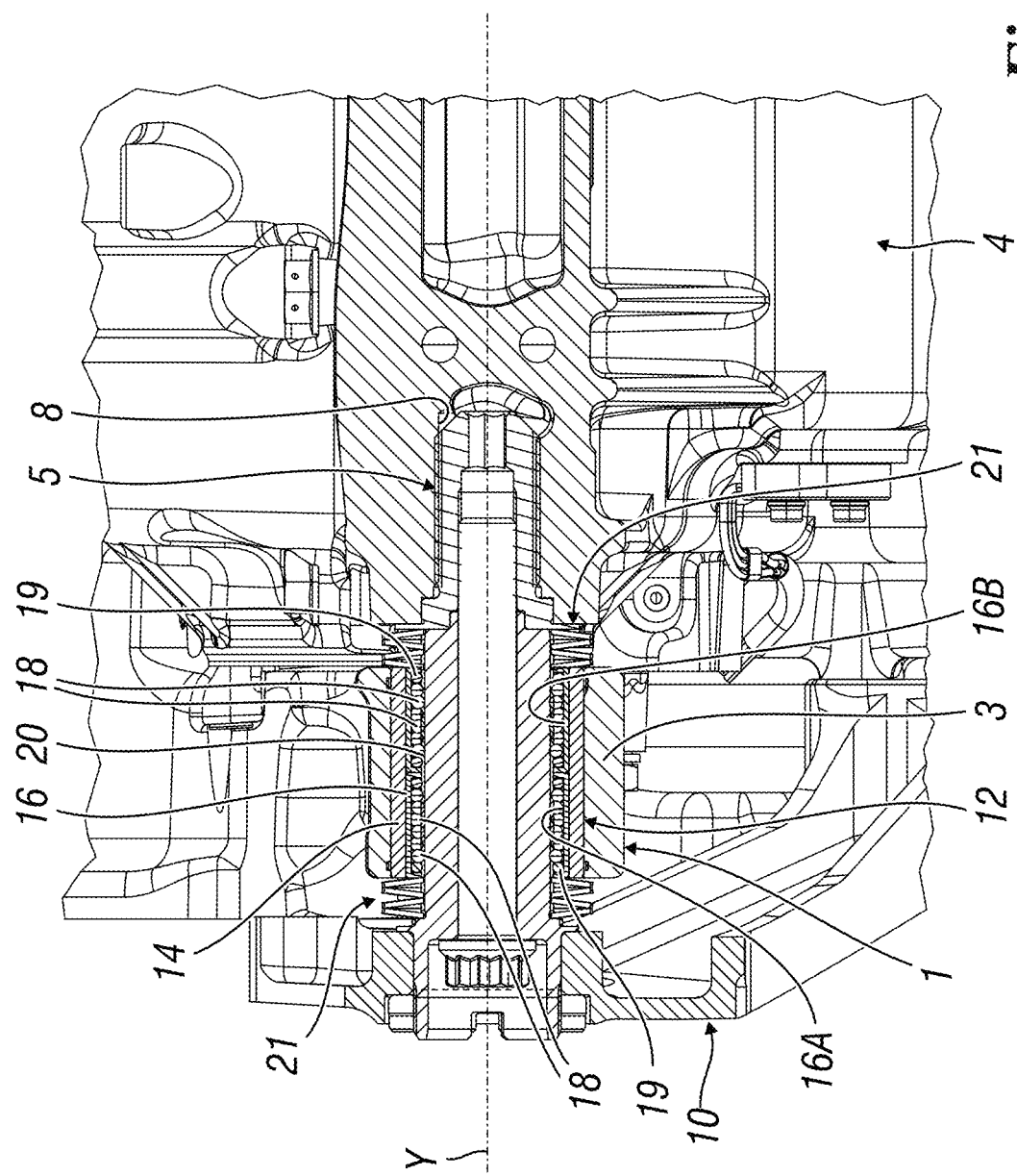
FIG. 2 shows a view of a detail of FIG. 1.
Figure 3:
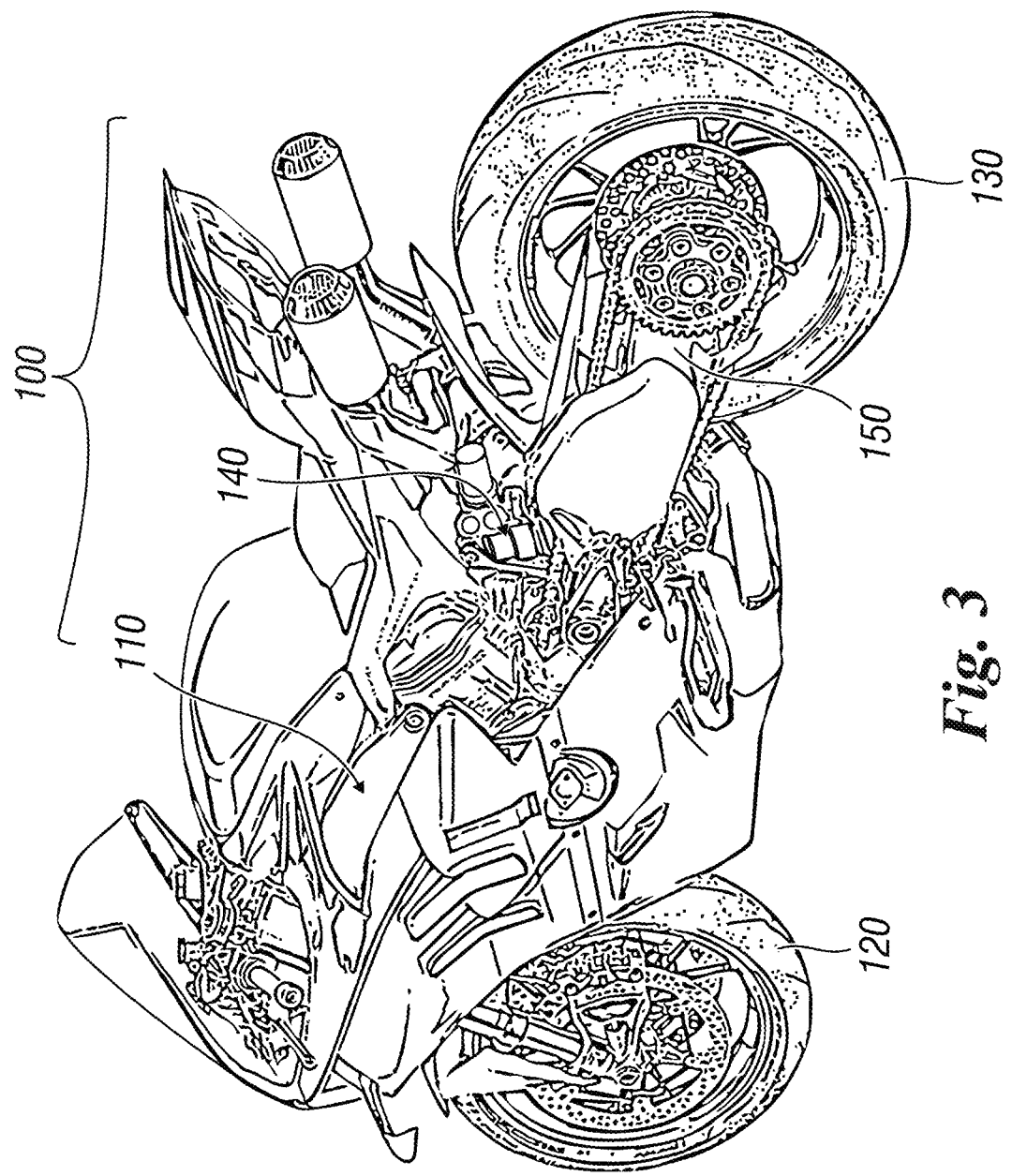
FIG. 3 shows a perspective view of the motorcycle according to the invention.

With reference to the aforementioned figures, a motorcycle 100 comprises a common chassis 110, a front wheel 120, a rear wheel 130, an engine 140 associated with the chassis and a rear swingarm which functionally constrains the rear wheel to the chassis. The expression "functionally" is used to indicate that the swingarm is fixed to a part or component of the motorcycle fixed to the chassis. In particular, the swingarm may be with one or two arms constrained to a hub of the rear wheel; the swingarm comprises at a first end two arms 1 and 2 which are shaped so as to house, between them, the part of the vehicle to which they are fixed.

The swingarm 150 may be connected to a crankcase 4 of the engine, which in this case collaborates with the chassis and it can be considered part thereof. This it is shown in FIG. 1 where end parts or "little hubs" 3 of said arms 1 and 2 are connected to the crankcase 4 through a corresponding threaded pin 5 which is inserted into a respective threaded hole 8 of the above mentioned crankcase.

The pin may be supported, like in the case shown in the figures, by plates 10, 11 constrained to the chassis and integrally joined with it in any known manner (and therefore part of it).

The swingarm or its hubs 3 may rotate around the pins 5 (which, as shown, are coaxial along the same axis Y orthogonal to a median plane W of the vehicle) during the movement of the motorcycle on the ground or on the road. Such rotary movement occurs against to a common suspension member (not shown) constrained to the swingarm and to the chassis of the vehicle in a known manner.

According to the invention, there is provided for the possibility of calibrating the lateral stiffness of the fork 150 and therefore of the entire rear axle of the motorcycle, said calibrating being suitable to be obtained along the axis Y mentioned above and providing for the possibility that the swingarm moves along such axis against to special elastic elements.

Before getting deeper into details of the invention, it should be observed that the rotation of each hub 3 around the respective pin 5 usually occurs by providing for mechanical de-coupling members or ball and/or roller bearings, axial and/or radial and/or oblique bearings interposed between the swingarm, chassis and pin. According to the invention, the bearings mentioned above are replaced by mechanical de-coupling members 12 and 13 adapted to allow both the rotation around the axis Y and the translation of each hub 3 and therefore of the entire swingarm along this axis. However, the suspension has an isostatic installation and therefore it is not affected by small lateral displacements. The swingarm is constantly free to move laterally along the axis Y besides on the longitudinal plane W.

Each mechanical de-coupling member 12, 13 may take various shapes, provided that they obviously guarantee an appropriate coefficient of friction: for example, they can be low friction sliding bushes, linear bushes, with hydrostatic support, with balls or the like.

An embodiment of a such de-coupling member is shown in the figures. According to the embodiment represented on the drawings, in a hole 14 of each hub 3 there is arranged a cage 16 containing a plurality of balls 18 in two sections 16A, 16B of the cage. In each section 16A, 16B the balls 18 are retained, on the respective opposite sides, by collapsible rings 19 and 20 (O-rings) on which the balls impact during each movement along a direction parallel to the axis Y caused by lateral forces for example introduced by depressions encountered by the vehicle while taking a curve.

At least one of the mechanical de-coupling members (in FIG. 1, the one 11 on the left) cooperates with elastic or visco-elastic elements such as for example belleville washers 21 arranged at the opposite ends of the cage 16 (and therefore of the member 12); such belleville washers 21 allow to calibrate or adjust the lateral stiffness of the swingarm in a concentrated manner.

Therefore, according to the invention, the swingarm may rotate around the axis Y, but it is also free to slide along the axis Y; such movement is counteracted by the belleville washers 21 with calibrated stiffness.

The displacement along the axis Y is allowed, using the low friction present between the balls 18 and the corresponding pin 5, by the lateral sliding of the balls in the respective cages and by the presence of collapsible rings 19 and 20.

The lateral displacement of the swingarm may be minor (a few millimetres), but it is still sufficient to allow an excellent absorption of the stresses.

A preferred embodiment of the invention has been described above with reference to a motorcycle. However, the invention could be applied to a bicycle. However, there may be provided for other embodiments in the light of the description above: for example, the belleville washers could be provided at the mechanical de-coupling members 12 and 13 arranged at both hubs 3 or they can be non-metal elements and the de-coupling elements may not be provided with balls, but defined by other prior art low friction movement and de-coupling devices. Another solution provides for that the single pins 5 be replaced by a shaft which connects the plates 10 and 11.

Even these solutions fall within the scope of protection of the invention as defined by the claims that follow.

The invention claimed is:

1. Two or three-wheeled motorcycle having
   a chassis supported by at least one front wheel and by at least one rear wheel, said chassis supporting at least one drive member,
   a swingarm functionally connecting said chassis with the at least one rear wheel,
   the swingarm comprising, at a first end, two arms functionally connected to the chassis through at least one pin connected to end parts of said arms,
   said end parts being connected to the at least one pin through mechanical de-coupling members inserted into corresponding holes of said end parts in which there is present said at least one pin to respectively locate said mechanical de-coupling member between said end part and said at least one pin,
   wherein each of said mechanical de-coupling members is a low friction sliding de-coupling member,
   said at least one pin having a longitudinal axis around which the end parts rotate during the movement of the motorcycle, said longitudinal axis being perpendicular to a median plane of the vehicle,
   wherein said end parts of said arms of the swingarm are free to also move laterally along said longitudinal axis of the at least one pin;
   wherein at least one of the de-coupling members cooperates with elastic elements arranged at opposite ends of such de-coupling member.

2. The motorcycle according to claim 1, wherein said de-coupling member is alternatively a low friction sliding bush or a linear bush.

3. The motorcycle according to claim 1, wherein said de-coupling member is alternatively a low friction sliding bush, or a linear bush, with hydrostatic support.

4. The motorcycle according to claim 1, wherein said mechanical de-coupling member comprises a cage having at least one series of a plurality of balls interposed between collapsible annular elements arranged in the cage at the two ends of the series of balls.

5. The motorcycle according to claim 4, wherein the cage comprises two sections each containing a plurality of balls interposed between collapsible annular elements inside each cage section.

6. The motorcycle according to claim 1, wherein each of the de-coupling members cooperates with elastic elements arranged at opposite ends of such de-coupling member.

7. The motorcycle according to claim 1, wherein said elastic elements have a predefined but variable stiffness.

8. The motorcycle according to claim 1, wherein said elastic elements are belleville washers.

9. The motorcycle according to claim 1, wherein the at least one drive member is selected from at least one member of the group consisting of an internal combustion engine, an electric engine, and a hybrid engine.

10. The motorcycle according to claim 1, wherein the at least one drive member is an internal combustion engine.

11. The motorcycle according to claim 1, wherein the at least one drive member is an electric engine.

12. The motorcycle according to claim 1, wherein the at least one drive member is a hybrid engine.

13. The motorcycle according to claim 1, wherein said de-coupling member is a sliding bush or a linear bush.

14. The motorcycle according to claim 6, wherein said de-coupling member is alternatively a low friction sliding bush, or a linear bush, with hydrostatic support.

15. The motorcycle according to claim 14, wherein said mechanical de-coupling member comprises a cage having at least one series of a plurality of balls interposed between collapsible annular elements arranged in the cage at the two ends of the series of balls.

16. The motorcycle according to claim 15, wherein the cage comprises two sections each containing a plurality of balls interposed between collapsible annular elements inside each cage section.

17. The motorcycle according to claim 16, wherein said elastic elements have a predefined but variable stiffness.

18. The motorcycle according to claim 16, wherein said elastic elements are belleville washers.

\* \* \* \* \*